United States Patent [19]

Fujino et al.

[11] 3,912,705
[45] Oct. 14, 1975

[54] THYROTROPIN RELEASING HORMONE ANALOGS

[75] Inventors: Masahiko Fujino, Takarazuka; Tsunehiko Fukuda, Suita; Chitoshi Hatanaka, Kyoto, all of Japan

[73] Assignee: Takeda Chemical Industries, Ltd., Osaka, Japan

[22] Filed: Feb. 7, 1974

[21] Appl. No.: 440,537

[30] Foreign Application Priority Data
Feb. 23, 1973  Japan.............................. 48-22544

[52] U.S. Cl.............................. 260/112.5; 424/177
[51] Int. Cl...................... C07c 103/52; C07g 7/00
[58] Field of Search................ 260/112.5, 112.5 CH

[56] References Cited
UNITED STATES PATENTS
3,821,188   6/1974   McKinley et al. ............... 260/112.5

OTHER PUBLICATIONS
Bowers et al., Biochem. Biophys. Res. Comm., 40, 683–691 (1970).
Chang et al., J. Med. Chem., 14, 484–487 (1971).

*Primary Examiner*—Lewis Gotts
*Assistant Examiner*—Reginald J. Suyat
*Attorney, Agent, or Firm*—Wenderoth, Lind & Ponack

[57] ABSTRACT

A novel compound of the formula

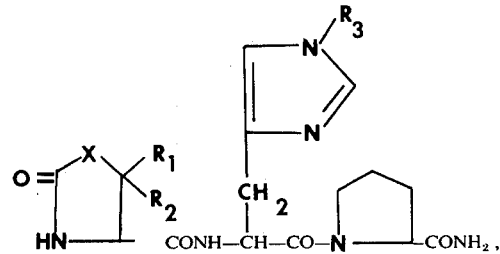

wherein each of $R_1$, $R_2$ and $R_3$ means hydrogen or an alkyl having 1 to 3 carbon atoms and X means oxygen or sulfur and its pharmaceutically acceptable salts, which are useful agents having a thyrotropin releasing hormone action for medical use.

4 Claims, No Drawings

THYROTROPIN RELEASING HORMONE ANALOGS

TRIPEPTIDE

This invention relates to a novel tripeptide of the formula

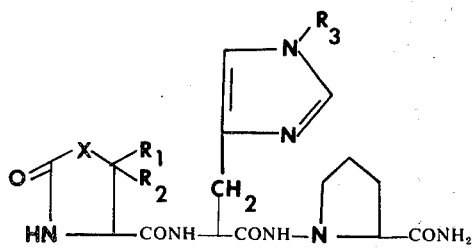

wherein $R_1$ is hydrogen;

$R_3$ is hydrogen or methyl;

X is oxygen or sulfur;

when X is oxygen, $R_2$ is hydrogen or methyl;

and when X is sulfur, $R_2$ is hydrogen and its pharmaceutically acceptable acid salts.

In the present specification and the claims, amino acids and peptides may be shown by the abbreviations which have been accepted in this field or have been adopted by IUPAC-IUB (International Union of Pure and Applied Chemistry-International Union of Biochemistry) Commission on Biological Nomenclature. Abbreviations used throughout the specification are exemplified as below:

Ser: L-Serine
His: L-Histidine
Pro: L-Proline
Thr: L-Threonine
Cys: L-Cysteine

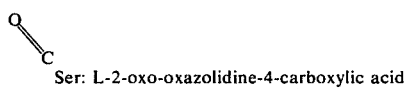

Ser: L-2-oxo-oxazolidine-4-carboxylic acid

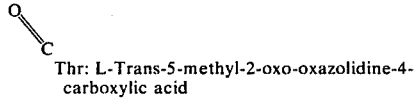

Thr: L-Trans-5-methyl-2-oxo-oxazolidine-4-carboxylic acid

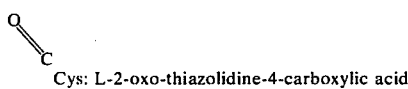

Cys: L-2-oxo-thiazolidine-4-carboxylic acid

DCC: N,N'-dicyclohexylcarbodiimide
Z: Benzyloxycarbonyl
$B_{ZL}$: Benzyl
His(im-3-Me): Imidazole-3-methyl-L-histidine
IBOC: Isobornyloxycarbonyl

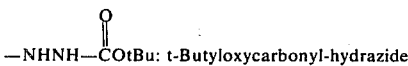

—NHNH—COtBu: t-Butyloxycarbonyl-hydrazide

HONB: N-Hydroxy-5-norbornene-2,3-dicarboximide
HOSu: N-Hydroxysuccinimide
HOBT: N-Hydroxybenztriazole Me: Methyl Referring to the above definitions, the alkyl represented by $R_1$, $R_2$ and $R_3$ is exemplified by methyl, ethyl or isopropyl.

The present inventors synthesized the compound (I) and found unexpectedly:

1. that the compound (I) exhibits thyrotropin releasing hormone action and
2. that the compound (I) does not exhibit a side effect on central nervous system such as Dopa($\beta$-(3,4-Dihydroxyphenyl)-L-alanine)potentiating action at the dose level of producing the thyrotropin releasing hormone action which is accompanied with the known thyrotropin releasing hormone.

Based upon those findings, the present invention was accomplished.

The first object of the present invention is to provide the compound (I).

The second object is to provide a process for preparation of the compound (I).

Further objects will be made clear from the present specification.

The compound (I) is prepared by condensing an amino acid or a peptide fragment which can constitute the compound (I) [the underlined portion is hereinafter referred to as "reagent (A)"] with the remaining fragment which can constitute the compound (I) [the underlined portion is hereinafter referred to as "reagent (B)"].

Basic combinations of the reagent (A) and the reagent (B) are exemplified in Table 1. In the table, the respective moieties constituting the compound (I) are abbreviated as below (i.e. $a$, $b$, $c$ and $d$):

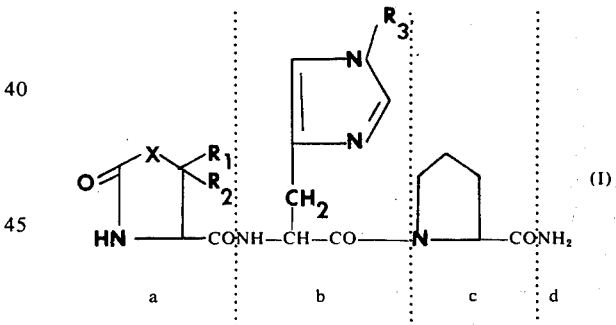

Table 1

| Reagent Combination | A | B |
|---|---|---|
| 1 | a - OH | H - b - c - d |
| 2 | a - b - OH | H - c - d |
| 3 | a - b - c - OH | H - d (i.e.$NH_3$) |

The present condensation reaction can be conducted by employing suitably per se conventional condensation techniques for formation of peptide bonds. The condensation techniques are exemplified by the azide process, the chloride process, the acid anhydride process, the mixed acid anhydride process, the DCC process, the active ester process, the process employing Woodward's reagent K, the carbodiimidazole process and the oxidation-reduction process and DCC/HONB process. Those processes are described in "The Peptides" Vol.1(1966) written by Schröder and Lubke and published from Academic Press, New York, U.S.A.

Prior to carrying out the present condensation reaction, amino and/or carboxyl group of the starting amino acids and/or peptides which are not involved in the intended peptide bond formation may be protected with conventional protecting group or groups by conventional techniques. Carboxyl group of the starting amino acid or peptide may be protected, for instance, in the form of metal salts (e.g. sodium or potassium salt) or in the form of esters (e.g. methyl, ethyl, benzyl, p-nitrobenzyl, t-butyl or t-amyl ester).

Protective group for amino group of the starting amino acids or peptides is, for example, formyl, phthalyl, trifluoroacetyl, p-toluenesulfonyl, benzyloxycarbonyl, p-methoxybenzyloxycarbonyl, p-nitrobenzyloxycarbonyl, p-chlorobenzyloxycarbonyl, t-butyloxycarbonyl, t-amyloxycarbonyl, trichloroacetyl, isobornyloxycarbonyl, diphenylmethyloxycarbonyl or triphenylmethyl.

The imidazole ring in the moiety $b$ wherein $R_3$ takes hydrogen may be protected prior to the present condensation reaction with per se conventional protecting group such as benzyl, p-toluenesulfonyl, 2,4-dinitrophenyl, isobornyloxycarbonyl, t-butyloxycarbonyl or benzyloxycarbonyl group by per se conventional techniques.

The following are some of practicable procedures of the present process.

i. Reagent (A) having a free carboxyl group as its C-terminal group and a protected amino group is reacted with reagent (B) having a free amino group as its N-terminal group and a protected carboxyl group in the presence of a dehydrating agent.

ii. Reagent (A) having an activated carboxyl group as its C-terminal group and a protected amino group is reacted with reagent (B) having a free amino group as its N-terminal group, and iii. Reagent (A) having a free carboxyl group as its C-terminal group and a protected amino group is reacted with reagent (B) having an activated amino group as its N-terminal group and a protected carboxyl group.

In the present process there may suitably be employed conventional dehydrating agents, for example, the so-called carbodiimide reagents (e.g. dicyclohexylcarbodiimide).

An activated carboxyl group of the reagent (A) is exemplified by the corresponding acid anhydride, azide, active ester (e.g. the corresponding ester of alcohol such as pentachlorophenol, 2,4,5-trichlorophenol, 2,4-dinitrophenol, cyanomethylalcohol, p-nitrophenol, N-hydroxy-5-norbornene-2,3-dicarboximide, N-hydroxysuccinimide, N-hydroxyphthalimide or N-hydroxybenztriazole). Among those esters, N-hydroxy-5-norbornene-2,3-dicarboximide ester is desirable.

An activated amino group of the reagent (B) includes the corresponding phosphorous acid amide.

Some embodiments of the present process are shown in the following charts.

Procedure 1

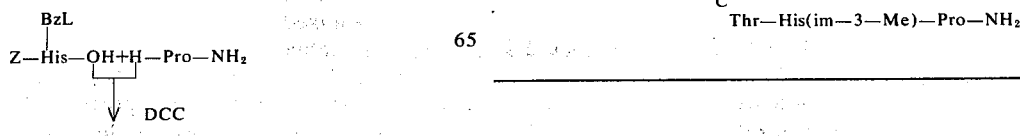

Procedure 1-Continued

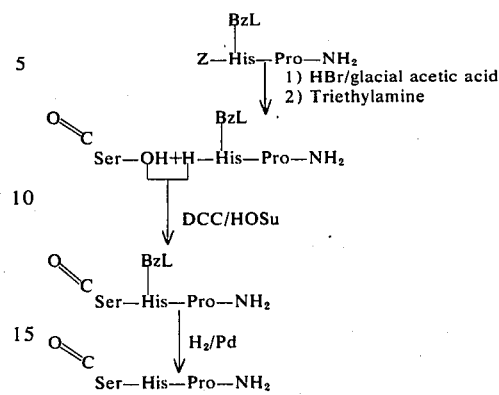

Procedure 2

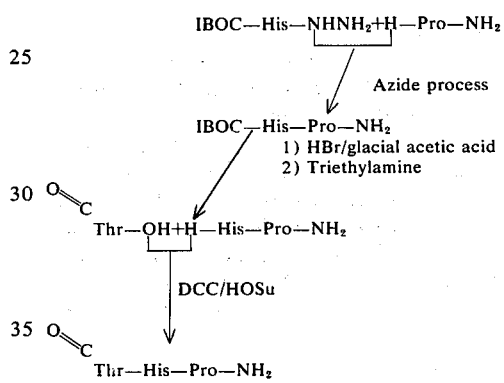

Procedure 3

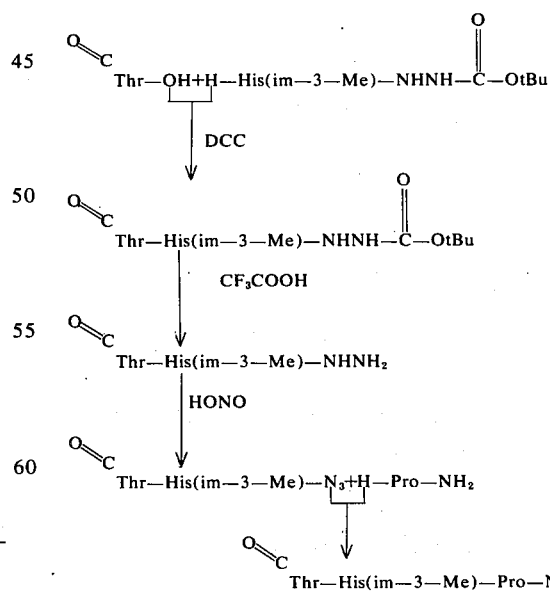

Procedure 4

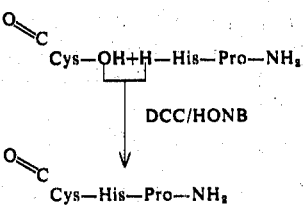

Procedure 5

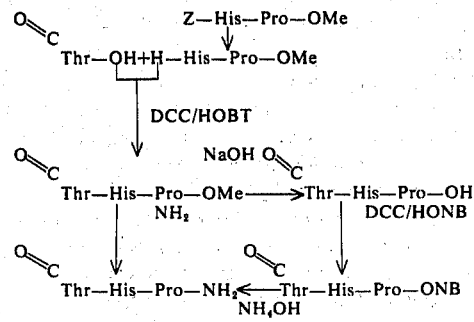

Reaction temperature is selected suitably from the range employed in conventional peptide bond formation reaction and it may be a temperature from about −20°C to about 30°C.

After the condensation reaction is completed, a protecting group, if remained in the resulting compound, can be removed by per se conventional procedure. Such a conventional procedure is, for example, catalytic reduction employing palladium-black, palladium-on-carbon or platinum as a catalyst; acid hydrolysis with, for example, hydrogen fluoride or trifluoroacetic acid; or a reduction with sodium metal in liquid ammonia.

The compound (I) thus produced in the resulting mixture is recovered therefrom by per se conventional procedure, for instance, by evaporating liquid portion of the resulting mixture under reduced pressure. The compound (I) thus recovered may be purified by per se conventional purification procedure, for instance, by a column chromatography on silica gel.

The compound (I) may be recovered as an acid salt of an inorganic acid (e.g. hydrochloric acid) or of an organic acid (e.g. acetic acid).

The compound (I) is useful as an agent with thyrotropin releasing hormone action without causing an undesirable side effect such as Dopa potentiating action. Such an action is remarkable particularly in L configuration of the compound (I).

The compound (I) may be administered by injection or oral route to mammals including human beings for promoting lactation or inhibiting gestation. The compound (I) may be administered as a conventional dosage form such as a tablet, a capsule, powder, granules, an injection solution which are prepared by a conventional procedure. The compound (I) may be prepared into an injection solution by dissolving 100γ of the compound into 1 ml. of physiological saline. The compound (I) may be stored in a frozen state after being lyophilized together with mannitol and put into use after being dissolved in a physiological saline. Dose may be variable depending upon an individual compound (I), symptom of a disease, a kind of a host, etc. A usual dose may range from about 1γ to about 1 mg./kg. of body weight per one administration by injection and from about 10γ to about 100 mg. on the same basis upon oral administration.

Amino acids and peptides which are employable in the present process are prepared by known procedures which are exemplified as below.

REFERENCE EXAMPLE FOR PREPARATION OF THE STARTING COMPOUNDS

Preparation of L-2-oxo-oxazolidine-4-carboxylic acid In 960 ml. of a 12.5 % aqueous solution of potassium hydroxide, there is dissolved 27.3 g. (0.26 mole) of L-serine and under cooling at 4°–5°C and vigorous stirring, a cold solution of 58 g. of phosgene in 40 ml. of toluene is added dropwise over a period of 75 minutes. The mixture is stirred at 4°–7°C for one hour, at the end of which time the toluene layer is separated. The water layer is washed twice with 250 ml. of ether. The water layers are then rendered acid to pH 3 with 3N hydrochloric acid and, then, the water is evaporated under reduced pressure. The residue is extracted with 800 ml. of hot methanol, the latter being then removed by evaporation. The residue is dissolved in water and the solution is run onto a column (3.5×38cm) of a strong acid ion exchange resin (i.e. Dowex-50 produced by The Dow Chemical Co., U.S.A.). The effluent and washings are pooled and concentrated to dryness under reduced pressure. The residue is dried well and recrystallized from ethyl acetate-petroleum benzin. The procedure gives 16.6 g. (48 %) of L-2-oxo-oxazolidine-4-carboxylic acid.

Melting point: 112° – 113°C, $[\alpha]_D^{28} = -18.7°$ (c=1.0, water)

Elemental analysis for $C_4H_5O_4N$. Calcd. C, 36.65; H, 3.85; N, 10.69; Found. C, 36.86; H, 3.68; N, 10.67.

By a similar procedure to the above, the following starting compounds are prepared.

L-2-oxothiazolidine-4-carboxylic acid, melting point: 170°–172°C.

L-trans-5-methyl-2-oxo-oxazolidine-4-carboxylic acid, melting point: 134°–136°C.

EXAMPLE 1

Preparation of L-2-oxo-oxazolidine-4-carbonyl-L-histidyl-L-prolineamide

In the presence of 0.1 ml. of anisole, there is dissolved 1.1 g. [2.55 millimoles (abbreviated as "mM")] of isobornyloxycarbonyl-L-histidyl-L-prolineamide in 10 ml. of trifluoroacetic acid and the reaction is allowed to proceed at room temperature for 40 minutes. Finally, 2 ml. of 4 N HCl-dioxane is added, followed by evaporation. The residue is treated with ether and the resultant powder is harvested by filtration and dried in a desiccator over soduim hydroxide. The procedure gives powder of L-histidyl-L-prolineamide dihydrochloride. (The same compound can also be obtained by reducing carbobenzoxy-L-histidyl-L-prolineamide in ethanol and in the presence of two molecular equivalents of HCl using palladium black as a catalyst, removing the catalyst by filtration and concentrating the filtrate to dryness under reduced pressure.) This powder together with 400 mg. (3.08 mM) of L-2-oxo-oxazolidine-4-carboxylic acid and 550 mg. (3.08 mM) of N-hydroxy-5-norbornene-2,3-dicarboximide, is dissolved in 5 ml. of dimethylformamide and, then, under cooling with ice, 0.67 ml. of N-ethylmorpholine is added. Thereafter, 635 mg. (3.08 mM) of N,N'-dicyclohexylcarbodiimide is added and the mixture is stirred for 12 hours. The dicyclohexylurea that has separated out is removed by filtration and the filtrate is concentrated to dryness under reduced pressure. The residue is dissolved in a mixture of chloroform and methanol (9:1) and the solution is run onto a column (4×8cm) of silica gel. The column is washed with a mixture of chloroform and methanol (7:3) and the contemplated product is eluted with 60 % aqueous methanol. The eluate is distilled under reduced pressure and the residue is dissolved in water and adsorbed on a column (2×30cm) of a weakly acid cation exchanger (i.e. carboxymethyl-sephadex, a product of Pharmacia, A.S. Sweden). The column is then irrigated by the gradient elution method, using aqueous solutions of ammonium acetate from 0.005 mole to 0.2 mole (500 ml./500 ml.). The contemplated product emerges in the fractions corresponding to 390 ml. to 550 ml. and, therefore, these fractions are collected and lyophilized. The procedure gives 523 mg. (56 %) white powder of the acetate of L-2-oxo-oxazolidine-4-carbonyl-L-histidyl-L-prolineamide.
$[\alpha]_D^{22} = -45.3°(c=0.53$, acetic acid); amino acid analysis (5.7 N HCl, 105°C, 16 hours): Ser : His : Pro = 0.85 : 1.03 : 1.00

Rf value of thin layer chromatography [Solvent: n-butanol : ethyl acetate : acetic acid : water = 1 : 1 : 1 : 1. Plate: Woelm precoated TLC sheet silica gel F-254/366 (Woelm, Wt. Germany)]=0.18 Negative to ninhydrin reagent and positive to Pauly reagent.

EXAMPLE 2

Preparation of L-trans-5-methyl-2-oxo-oxazolidine-4-carbonyl-L-histidyl-L-prolineamide In 5 ml. of dimethylformamide are dissolved 650 mg. (2 mM) of L-histidyl-L-prolineamide dihydrochloride, 311 mg. (2.2 mM) of L-trans-5-methyl-2-oxo-oxazolidine-4-carboxylic acid and 250 mg. of N-hydroxysuccinimide. Under cooling with ice, 0.51 ml. of N-ethylmorpholine and, then, 453 mg. (2.2 mM) of N,N'-dicyclohexylcarbodiimide are added. The mixture is stirred for 15 hours. Then, the reaction mixture is filtered to remove the insolubles and the filtrate is concentrated to dryness under reduced pressure. The residue is dissolved in a mixture of chloroform and methanol (9:1) and adsorbed on a column (3×7cm) of silica gel. The column is first washed with a mixture of chloroform and methanol (8:2) and, then, the contemplated product is eluted with a mixture of chloroform and methanol (4:6). The solvent is evaporated under reduced pressure and the residue is dissolved in 5 ml. of water. The aqueous solution is run onto a column (2×50cm) of agar gel (i.e. Sephadex LH-20, a product of Pharmacia, A.S. Sweden) and the fractions containing the contemplated product are lyophilized. The procedure gives 250 mg. (33 %) of white powder of L-trans-5-methyl-2-oxo-oxazolidine-4-carbonyl-L-histidyl-L-prolineamide. $[\alpha]_D^{25} = -41.1°(c=0.52$, 5 % acetic acid) Amino acid analysis: Thr : His : Pro = 1.00 : 1.00 : 0.97 Rf value of thin layer chromatography on the same type of the plate with the same kind of the solvent as in Example 1 = 0.24

EXAMPLE 3

Preparation of L-2-oxothiazolidine-4-carbonyl-L-histidyl-L-prolineamide

In 6 ml. of dimethylformamide, there are dissolved 260 mg. (2 mM) of L-2-oxothiazolidine-4-carboxylic acid and 650 mg. of L-histidyl-L-prolineamide dihydrochloride and, further, 271 mg. of N-hydroxybenztriazole. Under cooling with ice, 0.3 ml. of triethylamine and, then, 460 mg. of N,N'-dicyclohexylcarbodiimide are added. The mixture is stirred for 20 hours, after which time the reaction mixture is filtered. The filtrate is concentrated to dryness under reduced pressure and the concentrate is dissolved in 20 ml. of water. The insolubles, which are formed in minor amounts, are removed by filtration and the filtrate is adsorbed on a column (2×30cm) of carboxymethyl-sephadex. The column is then irrigated with aqueous solutions of ammonium acetate from water to 0.1 mole concentration (500 ml./500 ml.) by the gradient elution method. The fractions containing the contemplated product are pooled and lyophilized. The procedure gives 430 mg. of white powder. Amino acid analysis : CysH : His : Pro = 0.73 : 1.00 : 0.98 Rf value of thin layer chromatography on the same type of the plate with the same kind of the solvent as in Example 1 = 0.20.

What is claimed is:
1. A compound of the formula

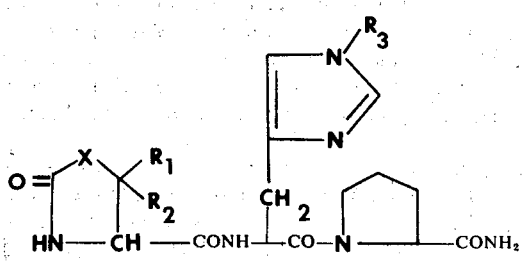

wherein all amino acid moieties are L-isomers and wherein
$R_1$ is hydrogen;
$R_3$ is hydrogen or methyl;
X is oxygen or sulfur;
when X is oxygen, $R_2$ is hydrogen or methyl; and
when X is sulfur, $R_2$ is hydrogen;
or its pharmaceutically acceptable acid salts.

2. The compound as claimed in claim 1, wherein the compound is L-2-oxo-oxazolidine-4-carbonyl-L-histidyl-L-prolineamide.

3. The compound as claimed in claim 1, wherein the compound is L-trans-5-methyl-2-oxo-oxazolidine-4-carbonyl-L-histidyl-L-prolineamide.

4. The compound as claimed in claim 1, wherein the compound is L-2-oxothiazolidine-4-carbonyl-L-histidyl-L-prolineamide.

* * * * *